(12) United States Patent
Lee et al.

(10) Patent No.: US 11,978,244 B2
(45) Date of Patent: May 7, 2024

(54) LOCATION RECOGNITION METHOD AND APPARATUS IN ATYPICAL ENVIRONMENT

(71) Applicant: ELECTRONICS AND TELECOMMUNICATIONS RESEARCH INSTITUTE, Daejeon (KR)

(72) Inventors: So Yeon Lee, Sejong-si (KR); Blagovest Iordanov Vladimirov, Gyeongsangnam-do (KR); Sang Joon Park, Sejong-si (KR); Jin Hee Son, Daejeon (KR); Chang Eun Lee, Daejeon (KR); Sung Woo Jun, Daejeon (KR); Eun Young Cho, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 279 days.

(21) Appl. No.: 17/551,038

(22) Filed: Dec. 14, 2021

(65) Prior Publication Data

US 2022/0277555 A1 Sep. 1, 2022

(30) Foreign Application Priority Data

Dec. 16, 2020 (KR) .................. 10-2020-0176412

(51) Int. Cl.
*G06V 10/80* (2022.01)
*G01C 21/00* (2006.01)
(Continued)

(52) U.S. Cl.
CPC ........ *G06V 10/803* (2022.01); *G01C 21/3826* (2020.08); *G01C 21/3837* (2020.08);
(Continued)

(58) Field of Classification Search
CPC ...... G06V 10/803; G06V 20/41; G06V 20/44; G06V 20/70; G06V 20/00; G01C 21/3826;
(Continued)

(56) References Cited

U.S. PATENT DOCUMENTS

| 8,626,188 B2 | 1/2014 | Cho et al. |
| 9,584,973 B2 | 2/2017 | Park |

(Continued)

FOREIGN PATENT DOCUMENTS

| KR | 101841741 B1 | 3/2018 |
| KR | 102110813 B1 | 5/2020 |

OTHER PUBLICATIONS

Shuhuan et al, ("Hybrid Semi-Dense 3D Semantic-Topological Mapping from Stereo Visual-Inertial Odometry SLAM With Loop Closure Detection", IEEE Transactions on vehicular technology, vol. 69, No. 12, Dec. 2020) (Year: 2020).*

(Continued)

*Primary Examiner* — Amara Abdi
(74) *Attorney, Agent, or Firm* — Rabin & Berdo, P.C.

(57) ABSTRACT

Provided is an atypical environment-based location recognition apparatus. The apparatus includes a sensing information acquisition unit configured to, from sensing data collected by sensor modules, detect object location information and semantic label information of a video image and detect an event in the video image; a walk navigation information provision unit configured to acquire user movement information; a metric map generation module configured to generate a video odometric map using sensing data collected through a sensing information acquisition unit and reflect the semantic label information; and a topology map generation module configured to generate a topology node using sensing data acquired through the sensing information acquisi- (Continued)

tion unit and update the topology node through the collected user movement information.

14 Claims, 9 Drawing Sheets

(51) Int. Cl.
*G06T 7/70* (2017.01)
*G06V 20/40* (2022.01)
*G06V 20/70* (2022.01)

(52) U.S. Cl.
CPC .............. *G06T 7/70* (2017.01); *G06V 20/41* (2022.01); *G06V 20/44* (2022.01); *G06V 20/70* (2022.01); *G06T 2207/10016* (2013.01); *G06T 2207/20081* (2013.01); *G06T 2207/30196* (2013.01); *G06T 2207/30241* (2013.01)

(58) Field of Classification Search
CPC ............. G01C 21/3837; G01C 21/206; G01C 21/383; G01C 21/3848; G06T 7/70; G06T 2207/10016; G06T 2207/20081; G06T 2207/30196; G06T 2207/30241; G06T 7/20; G01S 13/89; G01S 17/89
See application file for complete search history.

(56) References Cited

U.S. PATENT DOCUMENTS

| | | | |
|---|---|---|---|
| 10,746,847 | B2 | 8/2020 | Lee et al. |
| 10,762,006 | B2 | 9/2020 | Pihlman et al. |
| 10,885,342 | B1* | 1/2021 | Day ................. G10L 15/08 |
| 2014/0122031 | A1 | 5/2014 | Lee |
| 2019/0383922 | A1 | 12/2019 | Lee et al. |
| 2020/0033463 | A1 | 1/2020 | Lee et al. |
| 2021/0139116 | A1* | 5/2021 | Otake ................. G06V 40/10 |

OTHER PUBLICATIONS

Shunkai et al, (Sequential Adversarial Learning for Self-Supervised Deep Visual Odometry, 2019 IEEE, pp. 2851-2860) (Year: 2019).*
J. Engel, et al., "LSD SLAM: large scale direct monocular SLAM", 13th European Conference on Computer Vision ECCV 2014, Sep. 6-12, 2014, pp. 834~849.
Nikolay Savinov, et al. "Semi-Parametric Topological Memory for Navigation", ICLR, Mar. 1, 2018, arXiv:1803.00653v1 [cs.LG].
R. Mur Artal, et al. "ORB SLAM: A versatile and accurate monocular SLAM system", IEEE Trans. Robotics, vol. 31, No. 5, pp. 1147~1163, Oct. 2015.
Shuhuan Wen, et al., "Hybrid Semi-Dense 3D Semantic-Topological Mapping From Stereo Visual-Inertial Odometry SLAM With Loop Closure Detection", IEEE Transactions on Vehicular Technology 69.12, Dec. 2, 2020.
Shunkai Li, et al., "Sequential Adversarial Learning for Self-Supervised Deep Visual Odometry", Proceedings of the IEEE/CVF international conference on computer vision, Aug. 23, 2019.

* cited by examiner

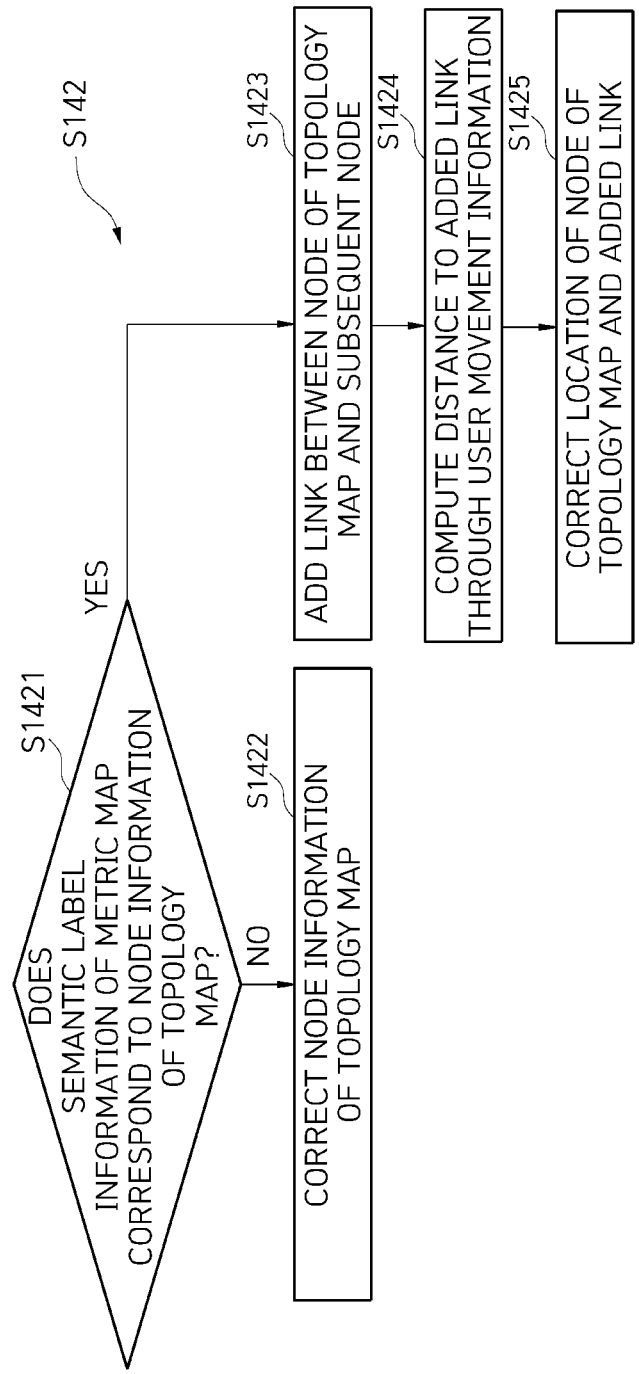

LOCATION RECOGNITION METHOD AND APPARATUS IN ATYPICAL ENVIRONMENT

CROSS-REFERENCE TO RELATED APPLICATION

This application claims priority to and the benefit of Korean Patent Application No. 2020-0176412, filed on Dec. 16, 2020, the disclosure of which is incorporated herein by reference in its entirety.

BACKGROUND

1. Field of the Invention

The present invention relates to an atypical environment-based location recognition apparatus, and more specifically, an atypical environment-based location recognition apparatus capable of gradually generating a map of a corresponding area, and at the same time, estimating precise locations in a moving object that moves in a GNSS-denied environment or in a building or underground facility that it enters for the first time without prior information.

2. Discussion of Related Art

As frontline operations have recently changed to focus on urban operations such as small-scale and counter-terrorism responses, it is essential to support advanced information communications technologies (ICT) that can be utilized when soldiers are engaged in their usual operational training and actual combat.

In particular, location information of soldiers is information that is essential to secure in training or actual combat, and many technical approaches have been attempted for the location information.

In most outdoor areas, a satellite navigation system that acquires location information using GNSS satellite signals is used, but this cannot be used in dense building areas or indoor spaces. Thus, a method of using wireless signals, a method of using a sensor, and the like have been proposed.

For general pedestrians, walking navigation using wireless signal analysis based on WiFi, BLE, mobile communication networks, and the like and sensor signal analysis based on an accelerometer and a gyro sensor is generally applied. However, a method of estimating the location of a terminal using IR-UWB, a method of merging walking navigation, and the like have been proposed for environments where infrastructure cannot be utilized.

With the technological advances of artificial intelligence and video recognition in recent years, interest in technology for performing simultaneous localization and mapping (SLAM) based on vision sensors is increasing.

SLAM is a technology that uses information acquired from sensors to create a map of the surrounding environment of a moving object, and at the same time, estimate the current location of the moving object. Various sensors (lidar, radar, laser, camera, etc.) may be used.

SLAM is a technology for estimating a user's location while creating a map of the environment when driving in an unknown space without prior information. Various methodologies have been studied. These methodologies had a common problem that real-time performance is low due to a large amount of computation. However, by integrating deep learning, which is the core of recent technological progress in the computer vision field, opportunities to increase the performance of the SLAM technology have become available.

Video SLAM (hereafter referred to as VSLAM) is a real-time version of Structure from Motion (SfM), which solves the SLAM problem using a visual odometric map.

Oriented FAST and Rotated BRIEF (ORB-SLAM), which is one of the handcraft feature point-based methods, is a method capable of utilizing an ORB feature point to compute camera trajectories and a 3D map in various environments.

Also, LSD-SLAM, which is one of the direct video-based methods, is a method of performing estimation using all image information without extracting key points or feature points.

This method provides higher accuracy and robustness in environments where it is difficult to extract key points or features, such as indoors, and enables a relatively denser 3D reconstruction.

In addition, conventional video-based driving path distance estimation methods rely on a handcraft feature point-based method, and these methods are optimized for the motion of objects with a large moving distance or stable acceleration or deceleration during the movement, such as automobiles, flying objects, or robots.

In addition, the conventional methods have a problem in that they are very vulnerable to real-time changing environments, motions of nearby objects, and relocation of objects, Meanwhile, a pedestrian is in an environment in which nearby people or objects change every moment, and a combatant's movement pattern itself is in a very dynamic environment in which movement distances are small, but changes in acceleration or deceleration in actual behavior are very large.

Accordingly, conventional video-based driving path distance estimations can hardly be applied to general pedestrian applications in which dynamic motions are random.

SUMMARY OF THE INVENTION

The present invention is to solve the conventional problems and is directed to providing an atypical environment-based location recognition apparatus capable of gradually generating a 3D map of an operational area, and at the same time, providing precise locations through the cooperation of combatants in a building or underground facility that is entered for the first time without prior information, in a GNSS-denied environment, in poor quality data collection due to irregular and dynamic motions of combatants, and in modified battlefield space conditions.

The present invention is also directed to providing an atypical environment-based location recognition apparatus capable of reducing the time required to build a map through a metric map using robust location recognition and semantic information that merge a multi-sensor-based VSLAM function and a walking navigation function and also reducing positional errors in order to maintain a certain level of performance over time by configuring a map to be robust against environmental changes.

The present invention is not limited to the above objectives, and other objectives not described herein may be clearly understood by those skilled in the art from the following description.

According to an aspect, there is provided an atypical environment-based location recognition apparatus including a sensing information acquisition unit configured to collect sensing data including a video image from sensor modules, a walking navigation information provision unit configured to acquire user movement information, a video analysis unit configured to detect object location information and semantic label information from the video image and analyze whether an event is detected in the video image, a metric map generation module configured to generate a video odometric map using sensing data collected through the sensing information acquisition unit and information analyzed through the video analysis unit and then reflect the semantic label information; and a topology map generation module configured to generate a topology node using sensing data acquired through the sensing information acquisition unit and update the topology node through collected user movement information.

The topology map generation module may include a node generation unit configured to generate a topology node through the semantic label information and object location information acquired through the sensing information acquisition unit, a transition determination unit configured to analyze location received event information and an actual user's location information to determine whether there is a need for node transition, a node management unit configured to update a location of the generated topology node according to whether to perform the transition, and a map merge unit configured to compare semantic label information provided through the metric map generation module to the topology node to merge the topology node and user location information.

Also, the topology map generation module may further include a self-supervised learning unit configured to perform self-supervised learning for a series of metric map functions generated from the user's trajectory.

The topology map generation module may further include a reinforcement learning unit configured to perform reinforcement learning when a metric map function sequence is generated in a path in which the topology node is generated.

The walking navigation information provision unit may acquire user movement information including the user's stride length, movement direction, and movement distance data and provide the user movement information to the topology map generation module.

The transition determination unit may include a node determination unit configured to determine whether the semantic label information of the metric map acquired through the video image corresponds to node information of a topology map on the basis of the user's location acquired through the sensing information acquisition unit, a node correction unit configured to correct the node information of the topology map when a determination result of the node determination unit is that the semantic label information of the metric map does not correspond to a node of the topology map, a link processing unit configured to add a link between the node of the topology map and a subsequent node when a determination result of the node determination unit is that the semantic label information of the metric map corresponds to the node of the topology map, a link distance computation unit configured to compute a distance of the added link through the user movement information provided from the walking navigation module, and a node transition unit configured to correct a location of the node of the topology map and the added link to correspond to the link distance computed by the link distance computation unit.

The topological map generation module may use uncorrected topology map information generated using actual map information.

According to another aspect, there is provided an atypical environment-based location recognition method including a sensing information acquisition operation for, from sensing data collected by sensor modules detecting object location information and semantic label information of a video image and detecting an event in the video image, acquiring user movement information, generating a video odometric map using the collected sensing data through a metric map generation module and reflecting the semantic label information, and generating a topology node using the collected sensing data through a topology map generation module and updating the topology node through the user movement information and the video odometric map.

The updating of the topology node may include generating, by a node generation unit, the topology node through the acquired semantic label information and object location information; analyzing, by a transition determination unit, received event information and an actual user's location information to determine whether there is a need for node transition; updating, by a node management unit, a location of the generated topology node according to whether to perform the transition; and comparing, by a map merge unit, the semantic label information provided through the metric map generation module to the topology node to merge the topology node and user location information.

The atypical environment-based location recognition method may further include performing, by a self-supervised learning unit, self-supervised learning for a series of metric map functions generated from the user's trajectory.

The atypical environment-based location recognition method may further include performing, by a reinforcement learning unit, reinforcement learning when a metric map function sequence is generated in a path in which the topology node is generated.

The acquiring of user movement information may include acquiring user movement information including the user's stride length, movement direction, and movement distance data and providing the user movement information to a topology map generation module.

The determining of whether to transition between a node and a user location may include determining, by a node determination unit, whether the semantic label information of the metric map acquired through the video image corresponds to node information of a topology map on the basis of the user's location acquired through a sensing information acquisition unit; correcting, by a node correction unit, the node information of the topology map when the semantic label information of the metric map does not correspond to a node of the topology map in the determination operation; adding, by a link processing unit, a link between the node of the topology map and a subsequent node when the semantic label information of the metric map corresponds to the node of the topology map in the determination operation; computing, by a link distance computation unit, a distance of the added link through the user movement information; and correcting, by a node transition unit, a location of the node of the topology map and the added link to correspond to the computed link distance.

The generating of a topology node may include using uncorrected topology map information generated using actual map information.

BRIEF DESCRIPTION OF THE DRAWINGS

FIG. 11 is a flowchart illustrating an operation of determining whether there is a transition between a node and a user location of FIG. 10.

DETAILED DESCRIPTION OF EXEMPLARY EMBODIMENTS

Advantages and features of the present invention, and implementation methods thereof will be clarified through the following embodiments described in detail with reference to the accompanying drawings. However, the present invention is not limited to embodiments disclosed herein and may be implemented in various different forms. The embodiments are provided for making the disclosure of the prevention invention thorough and for fully conveying the scope of the present invention to those skilled in the art. It is to be noted that the scope of the present invention is defined by the claims. The terminology used herein is for the purpose of describing particular embodiments only and is not intended to be limiting of the invention. Herein, the singular shall be construed to include the plural, unless the context clearly indicates otherwise. The terms "comprises" and/or "comprising" as used herein specify the presence of stated elements, steps, operations, and/or components but do not preclude the presence or addition of one or more other elements, steps, operations, and/or components.

Figure 1:
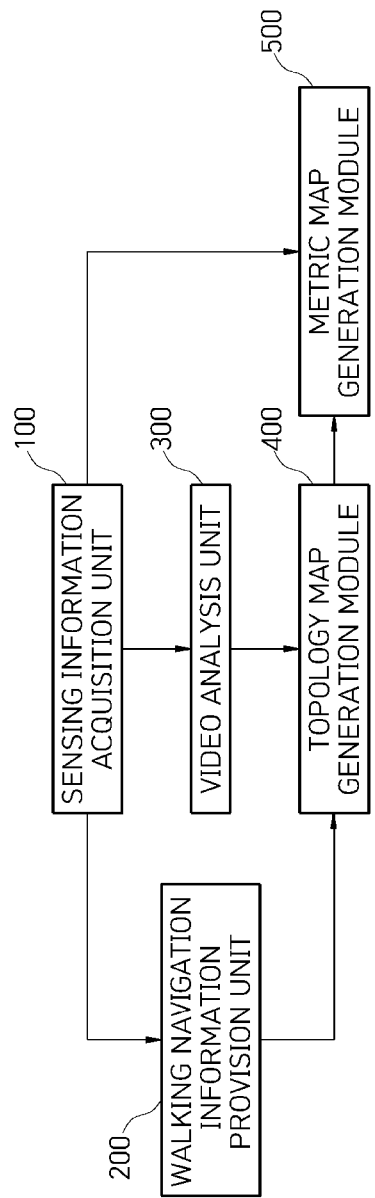
FIG. 1 is a functional block diagram illustrating an atypical environment-based location recognition apparatus according to the present invention.

FIG. 1 is a functional block diagram illustrating an atypical environment-based location recognition apparatus according to the present invention. As shown in FIG. 1, the atypical environment-based location recognition apparatus according to an embodiment of the present invention may include a sensing information acquisition unit 100, a walking navigation information provision unit 200, a video analysis unit 300, a topology map generation module 400, and a metric map generation module 500.

The sensing information acquisition unit 100 collects sensing data including a video image from sensor modules. The sensing information acquisition unit 100 may include a radar, a lidar, a laser, an infrared device, a stereo camera, an RGB-D camera, and inertial measurement unit (IMU) sensors and may use the collected sensing data. Here, an event in an image means whether a user is moving.

The walking navigation information provision unit 200 acquires user movement information from the sensing data collected through the sensing information acquisition unit 100. Here, the user movement information means a user's stride length, movement direction, and movement distance. In this embodiment, the user movement information may be calculated from sensing data acquired through an IMU sensor.

The video analysis unit 300 detects semantic label information and object position information from a sensed video image and analyzes whether an event is detected in the video image.

The metric map generation module 500 generates a video odometric map using the sensing data collected through the sensing information acquisition unit 100 and the information analyzed through the video analysis unit 300 and then reflects semantic label information. That is, the metric map generation module 500 reflects the semantic label information in a node detected through the generated video odometric map. Here, the node indicates an independent space surrounded by a wall, such as a room.

The metric map generation module 500, which uses a visual simultaneous localization and mapping (VSLAM) function, typically uses low-level image features (i.e., corners, blobs, etc.) to estimate a user's location and generate a metric map.

Figure 2:
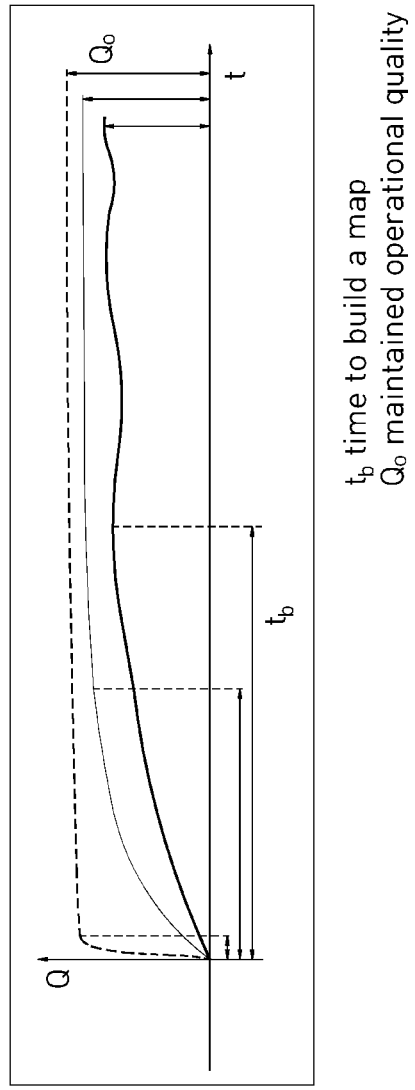
FIG. 2 is a reference diagram illustrating a map building time using a simultaneous localization and mapping (SLAM) function.

As shown by the blue line in FIG. 2, it is possible to distinguish an initial map building operation in which map quality is improved and a subsequent development operation in which the quality is maintained. In addition, as shown by the red line, in a harsh environment such as a battlefield environment, it takes much more time to build a usable-level map, and it is also difficult to maintain the usable level. In particular, changes in illuminance, blurred videos, etc. that may occur in a situation in which dynamic motion is intense increase the time required to build a metric map.

Also, the metric map depends on primary image characteristics. Thus, the metric map is very sensitive to environmental changes and requires more frequent updates in places where the environment changes frequently. The green line, which indicates the most ideal case, shows a situation in which the map is quickly and safely built.

The topology map generation module 400 generates a topology node using sensing data acquired through the sensing information acquisition unit 100 and updates the topology node through collected user movement information. In an embodiment of the present invention, the topology map is a simplified representation of the space, and the target space is expressed at a more condensed level.

Figure 3:
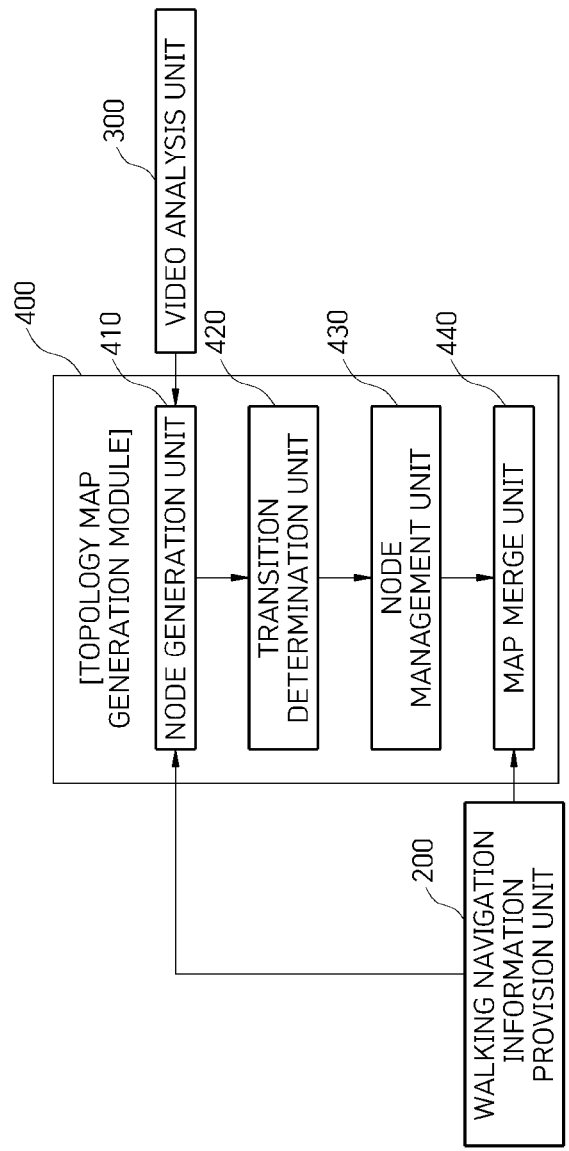
FIG. 3 is a block diagram illustrating a topology map generation module according to an embodiment of the present invention.

FIG. 3 is a block diagram illustrating a topology map generation module 400 according to an embodiment of the present invention.

As shown in FIG. 3, the topology map generation module 400 according to an embodiment of the present invention includes a node generation unit 410, a transition determination unit 420, a node management unit 430, and a map merge unit 440.

The node generation unit 410 generates a topology node through object location information and semantic label information acquired through the video analysis unit 300.

The transition determination unit 420 analyzes received event information and an actual user's location information to determine whether there is a need for node transition.

The node management unit 430 updates the location of the generated topology node according to whether to perform transition.

The map merge unit 440 compares the topology node and the semantic label information provided through the metric map generation module 500, merges the topology node and the user location information, and provides the merged topology node and user location information.

Figure 4:
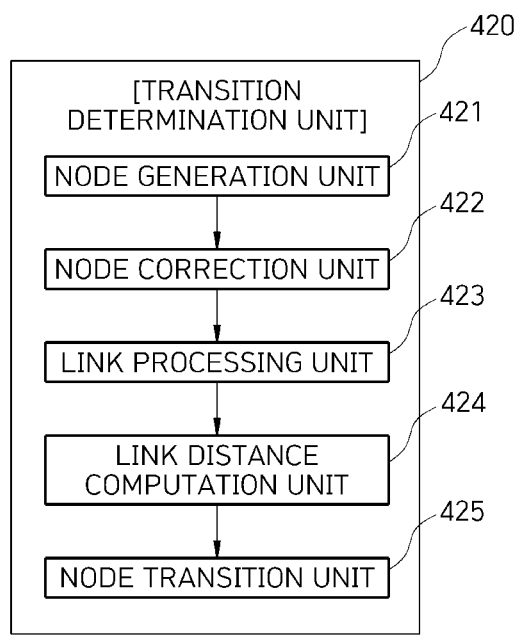
FIG. 4 is a block diagram illustrating a transition determination unit of FIG. 3.

FIG. 4 is a block diagram illustrating the transition determination unit of FIG. 3.

As shown in FIG. 4, the transition determination unit 420 includes a node determination unit 421, a node correction unit 422, a link processing unit 423, a link distance computation unit 424, and a node transition unit 425.

The node determination unit 421 determines whether the semantic label information of the metric map acquired through the video image corresponds to node information of the topology map on the basis of a user's location acquired through the sensing information acquisition unit 100.

When a result of the determination of the node determination unit 421 is that the semantic label information of the metric map does not correspond to the node of the topology map, the node correction unit 422 corrects subsequent node information of the topology map at the current user location.

As an example, when there is no node of the topology map but relevant information is present in the semantic label information of the metric map, the node correction unit 422 additionally constructs a node of the topology map. When there is a node of the topology map but relevant information is not present in the semantic label information of the metric map, the node correction unit 422 performs correction to delete the node of the topology map.

Meanwhile, when a determination result of the determination unit is that the semantic label information of the metric map corresponds to the node of the topology map, the link processing unit 423 adds a link between the node of the topology map and a subsequent node.

The link distance computation unit 424 computes a distance of the added link through user movement information provided from the walking navigation module.

The node transition unit 425 corrects the node location of the topology map and the distance of the added link to correspond to the link distance computed by the link distance computation unit 424.

As described above, since the topology map is in a state in which geometric relationships are excluded, user movement information generated by the walking navigation module, that is, values such as stride length, movement direction, and movement distance, is received to correct the link length between nodes and adjust the relative positions of the nodes.

Figure 5:
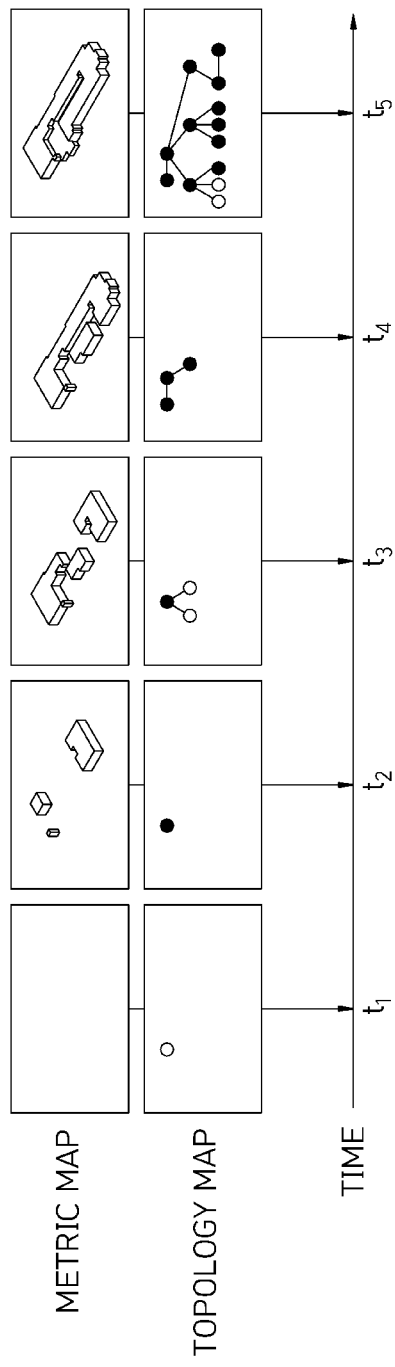
FIG. 5 is a reference diagram illustrating a process of generating a time-wise topology map corresponding to a user's movement by an atypical environment-based location recognition apparatus according to an embodiment of the present invention.

FIG. 5 is a reference diagram illustrating a process of generating a time-wise topology map corresponding to a user's movement by an atypical environment-based location recognition apparatus according to an embodiment of the present invention.

As shown in FIG. 5, according to an embodiment of the present invention, an atypical environment-based location recognition apparatus generates a topology map while moving over time. For example, as shown in FIG. 5, a circle, which is a node, may represent an independent space surrounded by a wall, such as a room, and a line may represent a link which is a passage connecting the rooms to each other.

Therefore, when training is performed to pre-detect video data from sensing data for various types of buildings and generate a topology map on the basis of the detected video data, the topology map creates a top-level graph more quickly than a metric map. Thus, it is possible to create and expand a node and a link according to the characteristics of a space in which soldiers are moving.

First, when a location recognition apparatus enters a building (t1), the topology map generation module 400 generates a virtual node of the topology map.

Subsequently, while the location recognition apparatus moves (t2) after entering the building, the metric map generation module 500 detects a node (an independent space surrounded by a wall, such as a room) through VSLAM and reflects semantic label information in the detected node.

When a node is detected through VSLAM, the topology map generation module 400 compares and matches the generated semantic label information of the node to the node detected through the metric map generation module 500.

Subsequently, the location recognition apparatus moves (t3), and the metric map generation module 500 consequently detects a subsequent node through VSLAM.

When no subsequent node is present in the generated topology map as in "t3," the topology map generation module 400 newly generates a virtual node.

In this case, the topology map generation module 400 corrects the location of the subsequent node of the topology map as in "t4" using user movement information acquired through the walking navigation information provision unit 200.

According to such an embodiment of the present invention, by a location recognition apparatus generating a topology map while moving into a building, when location recognition is to be performed in an atypical environment with dynamically high acceleration/deceleration, it is possible to generate an environment map more quickly and accurately even at a place visited for the first time and recognize a user's location in the place.

Also, according to an embodiment of the present invention, the minimum location recognition information may be provided in an environment where infrastructure has been lost or where wireless propagation is not good, and thus it is possible to make a significant contribution to improving the survivability of soldiers performing operations in the future.

Figure 6:
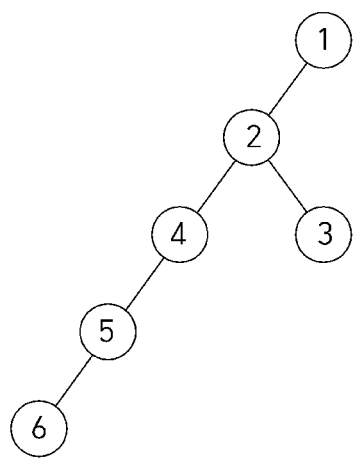
FIG. 6 is a reference diagram illustrating uncorrected topology map information that is basically generated before user movement information is acquired according to another embodiment of the present invention.

Meanwhile, as shown in FIG. 6, a topology map generation module according to another embodiment of the present invention may receive uncorrected topology map information (nodes 1 to 6) using map information and may store and manage the uncorrected topology map information in a separate memory.

Figure 7:
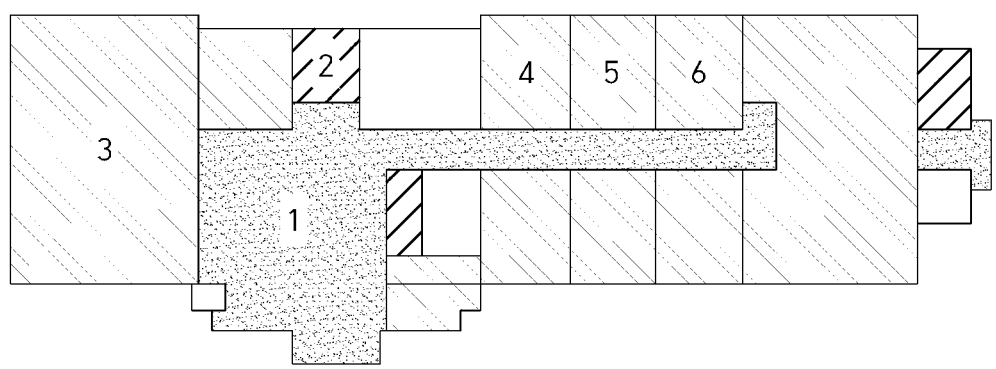
FIG. 7 is a reference diagram illustrating a map of an actual building.
Figure 8:
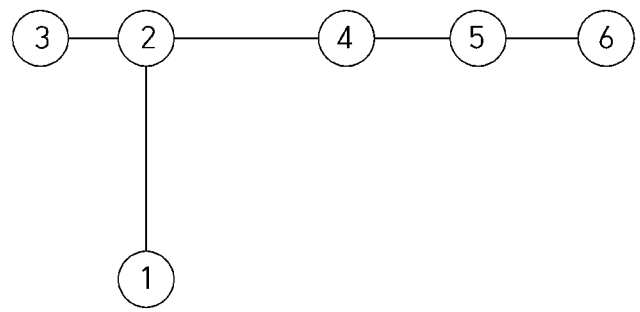
FIG. 8 is a reference diagram illustrating a topology map with nodes and links corrected by a walking navigation information provision unit of FIG. 1.

Based on the uncorrected topology map provided in this way, user movement information and semantic label information for a node of a video odometric map to be detected by searching an actual building of FIG. 7 which is detected by the metric map generation module 500 may be used to generate a topology map in which the locations of the nodes (nodes 1 to 6) are corrected as shown in FIG. 8 and to correct the length and location of a link connecting the nodes.

Meanwhile, the topology map generation module 400 may perform self-supervised learning for a series of metric map functions generated from the user's trajectory or may perform reinforcement learning when generating a metric map function sequence in a path in which the topology node is generated.

Figure 9:
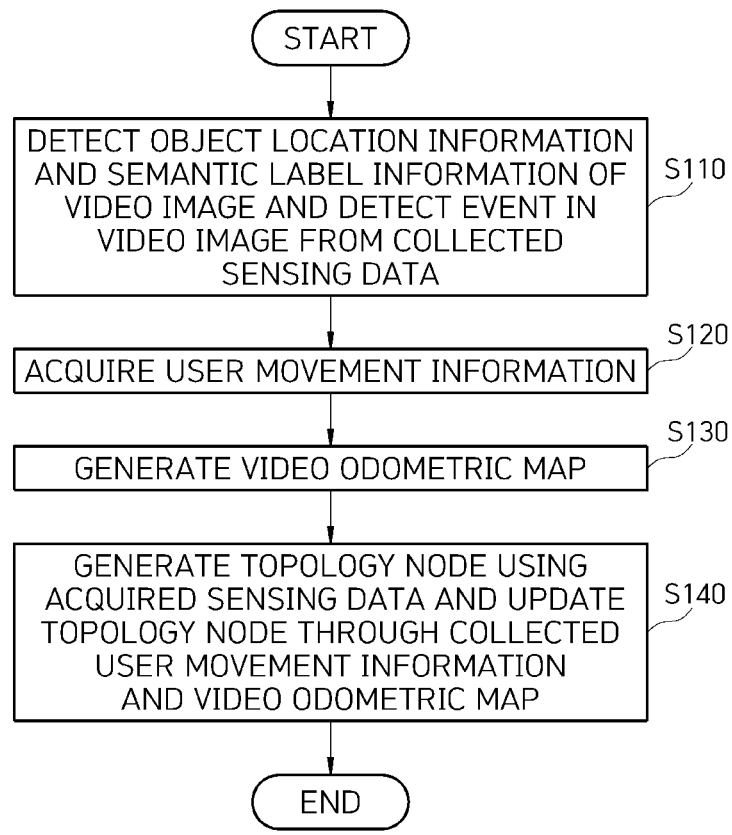
FIG. 9 is a flowchart illustrating an atypical environment-based location recognition apparatus according to an embodiment of the present invention.

An atypical environment-based location recognition method according to an embodiment of the present invention will be described below with reference to FIG. 9.

First, from sensing data collected by sensor modules, the video analysis unit 300 detects object location information and semantic label information of a video image and detects an event in the video image (S110).

Subsequently, a walking navigation information provision unit 200 acquires user movement information (S120). In the operation of acquiring the user movement information (S120), user movement information including the user's stride length, movement direction, and movement distance data is acquired and provided to a topology map generation module.

Subsequently, the metric map generation module 500 generates a video odometric map using the collected sensing data and then reflects the semantic label information (S130).

Subsequently, the topology map generation module 400 generates a topology node using the acquired sensing node and updates the topology node through collected user movement information and the video odometric map (S140).

Figure 10:
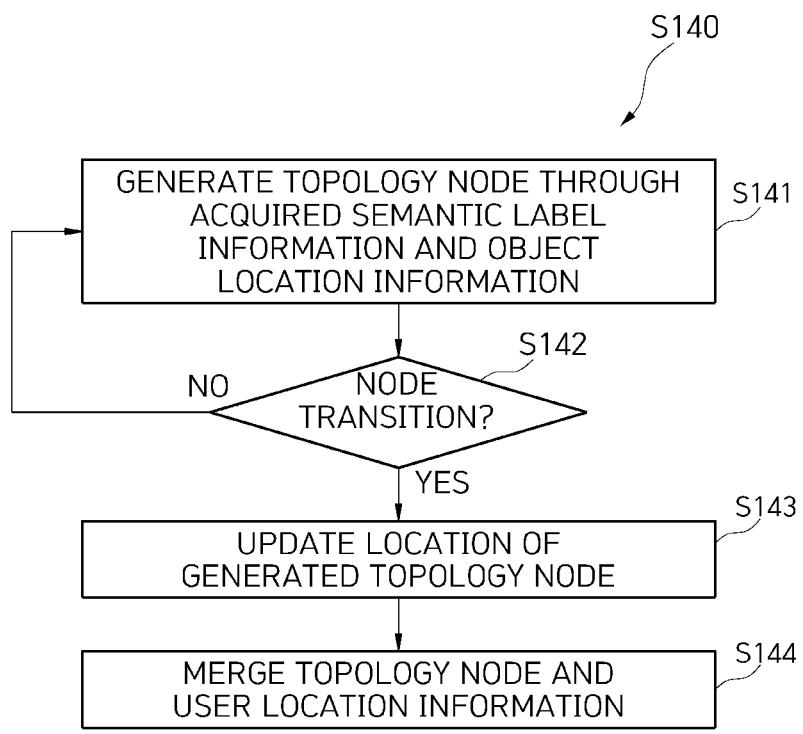
FIG. 10 is a flowchart illustrating an operation of updating a topology node of FIG. 9.

Sub-operations of the operation of updating the topology node (S140) according to an embodiment of the present invention will be described below with reference to FIG. 10.

The node generation unit generates a topology node through the acquired semantic label information and object location information (S141).

Subsequently, the transition determination unit analyzes received event information and an actual user's location information to determine whether there is a need for node transition (S142).

Also, the node management unit updates the location of the generated topology node according to whether to perform transition (S143).

Subsequently, the map merge unit compares the topology node and the semantic label information provided through the metric map generation module 500 and merges the topology node and the user location information (S144).

Sub-operations of the operation of determining whether there is a need for transition between a node and a user's location (S142) according to an embodiment of the present invention will be described below with reference to FIG. 11.

The node determination unit determines whether the semantic label information of the metric map acquired through the video image corresponds to node information of the topology map on the basis of a user's location acquired through the sensing information acquisition unit 100 (S1421).

When the semantic label information of the metric map does not correspond to the node of the topology map in the determination operation S1421 (NO), the node correction unit corrects the node information the topology map (S1422).

When the semantic label information of the metric map corresponds to the node of the topology map in the determination operation S1421 (YES), the link processing unit adds a link between the node of the topology map and a subsequent node (S1423).

Subsequently, the link distance computation unit computes a distance of the added link through provided user movement information (S1424).

The node transition unit corrects a node location of the topology map and the added link to correspond to the computed link distance (S1425).

According to an embodiment of the present invention, when location recognition is to be performed in an atypical environment with dynamically high acceleration/deceleration, it is possible to quickly and accurately generate an environment map even in a place visited for the first time.

Also, according to an embodiment of the present invention, the minimum location recognition information may be provided in an environment where infrastructure has been lost or where wireless propagation is not good, and thus it is possible to make a significant contribution to improving the survivability of soldiers performing operations in the future.

A self-supervised learning unit may perform self-supervised learning for a series of metric map functions generated from the user's trajectory or may perform reinforcement learning when generating a metric map function sequence in a path in which the topology node is generated.

Meanwhile, as shown in FIG. 6, a topology map generation module according to another embodiment of the present invention may receive uncorrected topology map information (nodes 1 to 6) using map information and may store and manage the uncorrected topology map information in a separate memory.

Based on the uncorrected topology map provided in this way, user movement information and semantic label information for a node of a video odometric map obtained by sensing an actual building (FIG. 7) which is detected by the metric map generation module 500 may be used to generate a topology map in which the locations of the nodes (nodes 1 to 6) are corrected as shown in FIG. 8 and to correct the length and location of a link connecting the nodes.

For reference, the elements according to an embodiment of the present invention may be implemented as software or hardware such as a field programmable gate array (FPGA) or an application specific integrated circuit (ASIC) and may perform predetermined roles.

However, the elements are not limited to software or hardware and may be configured to be in an addressable storage medium or configured to activate one or more processors.

Accordingly, as an example, the elements include elements such as software elements, object-oriented software elements, class elements, and task elements, processes, functions, attributes, procedures, subroutines, program code segments, drivers, firmware, microcode, circuits, data, databases, data structures, tables, arrays, and variables.

Elements and functions provided by corresponding elements may be combined into a smaller number of elements or may be divided into additional elements.

It will be understood that each block of the flowcharts and/or block diagrams, and combinations of blocks in the flowcharts and/or block diagrams, can be implemented by computer program instructions. These computer program instructions may be provided to a processor of a general-purpose computer, special purpose computer, or other programmable data processing apparatus, such that the instructions, which are executed via the processor of the computer or other programmable data processing apparatus, create means for implementing the functions specified in a flowchart block(s). These computer program instructions may also be stored in a computer-accessible or computer-readable memory that can direct a computer or other programmable data processing apparatus to function in a particular manner, such that the instructions stored in the computer-accessible or computer-readable memory can also produce articles of manufacture embedding instruction means which implement the functions specified in the flowchart block(s). The computer program instructions may also be loaded onto a computer or other programmable data processing apparatus to cause a series of operations to be performed on the computer or other programmable data processing apparatus to produce a computer-implemented process, such that the instructions, which are executed on the computer and other programmable data processing apparatus, can also provide operations for implementing the functions specified in the flowchart block(s).

Also, each block described herein may indicate a portion of a module, segment, or code including one or more executable instructions to execute a specific logical function(s). Moreover, it should be noted that the functions of the blocks may be performed in a different order in several modifications. For example, two successive blocks may be performed substantially at the same time, or they may be performed in reverse order according to their functions.

The term "unit" used herein refers to a software element or a hardware element such as an FPGA or an ASIC, and the "unit" performs any role. However, the term "unit" is not limited to software or hardware. A "unit" may be configured to be in an addressable storage medium or to execute one or more processors. Therefore, for example, the "unit" includes elements, such as software elements, object-oriented elements, class elements, and task elements, processes, functions, attributes, procedures, sub routines, segments of a program code, drivers, firmware, a microcode, a circuit, data, a database (DB), data structures, tables, arrays, and parameters. Furthermore, functions provided in elements and "units" may be combined as a smaller number of elements and "units" or further divided into additional elements and "units." In addition, elements and "units" may be implemented to execute one or more central processing units (CPUs) in a device or secure multimedia card.

According to such an embodiment of the present invention, by a location recognition apparatus generating a topology map while moving into a building, when location recognition is to be performed in an atypical environment with dynamically high acceleration/deceleration, it is possible to generate an environment map more quickly and accurately even at a place visited for the first time and recognize a user's location in the place.

The configuration of the present invention has been described above in detail with reference to the accompanying drawings, but this is merely an example. It will be appreciated that those skilled in the art can make various modifications and changes within the scope of the technical spirit of the present invention. Therefore, the scope of the present invention should not be limited to the above-described embodiments and should be defined by the appended claims.

What is claimed is:

1. An atypical environment-based location recognition apparatus comprising computer program instructions configured to, in response to execution by a computer, implement the following:
    a sensing information acquisition unit configured to collect sensing data including a video image from sensor modules;
    a walking navigation information provision unit configured to acquire user movement information;
    a video analysis unit configured to detect object location information and semantic label information from the video image and analyze whether an event is detected in the video image;
    a metric map generation module configured to generate a video odometric map using sensing data collected through the sensing information acquisition unit and information analyzed through the video analysis unit and then reflect the semantic label information; and
    a topology map generation module configured to generate a topology node using sensing data acquired through the sensing information acquisition unit and update the topology node through collected user movement information;
    wherein the topology map generation module comprises a transition determination unit configured to analyze received event information and an actual user's location information to determine whether there is a need for node transition; and
    wherein the transition determination unit comprises:
        a node determination unit configured to determine whether the semantic label information corresponds to node information of a topology map on the basis of a user's location acquired through the sensing information acquisition unit; and
        a node correction unit configured to correct the node information of the topology map when a determination result of the node determination unit is that the semantic label information does not correspond to a node of the topology map.

2. The atypical environment-based location recognition apparatus of claim 1, wherein the topology map generation module further comprises:
    a node generation unit configured to generate the topology node through the semantic label information and object location information acquired through the sensing information acquisition unit;
    a node management unit configured to update a location of the generated topology node according to whether to perform the node transition; and
    a map merge unit configured to compare semantic label information provided through the metric map generation module to the topology node to merge the topology node and the user's location information.

3. The atypical environment-based location recognition apparatus of claim 2, wherein the topology map generation module further comprises a self-supervised learning unit configured to perform self-supervised learning for a series of metric map functions generated from a user's trajectory.

4. The atypical environment-based location recognition apparatus of claim 2, wherein the topology map generation module further comprises a reinforcement learning unit configured to perform reinforcement learning when a metric map function sequence is generated in a path in which the topology node is generated.

5. The atypical environment-based location recognition apparatus of claim 1, wherein the walking navigation information provision unit acquires user movement information including the user's stride length, movement direction, and movement distance data and provides the user movement information to the topology map generation module.

6. The atypical environment-based location recognition apparatus of claim 2, wherein the transition determination unit further comprises:
    a link processing unit configured to add a link between the node of the topology map and a subsequent node when a determination result of the node determination unit is that the semantic label information corresponds to the node of the topology map;
    a link distance computation unit configured to compute a distance of the added link through the user movement information provided from the walking navigation module; and
    a node transition unit configured to correct a location of the node of the topology map and the added link to correspond to the link distance computed by the link distance computation unit.

7. The atypical environment-based location recognition apparatus of claim 1, wherein the topological map generation module uses uncorrected topology map information generated using actual map information.

8. An atypical environment-based location recognition method comprising:
- a sensing information acquisition operation for, from sensing data collected by sensor modules, detecting object location information and semantic label information of a video image and detecting an event in the video image;
- acquiring user movement information;
- generating a video odometric map using the collected sensing data through a metric map generation module and reflecting the semantic label information; and
- generating a topology node using the collected sensing data through a topology map generation module and updating the topology node through the user movement information and the video odometric map;
- wherein the updating of the topology node comprises analyzing, by a transition determination unit, received event information and an actual user's location information to determine whether there is a need for node transition; and
- wherein the determining of whether there is a need for node transition comprises:
  - determining, by a node determination unit, whether the semantic label information corresponds to node information of a topology map on the basis of a user's location acquired through a sensing information acquisition unit; and
  - correcting, by a node correction unit, the node information of the topology map when the semantic label information does not correspond to a node of the topology map in the determining.

9. The atypical environment-based location recognition method of claim 8, wherein the updating of the topology node further comprises:
- generating, by a node generation unit, the topology node through the semantic label information and object location information;
- updating, by a node management unit, a location of the generated topology node according to whether to perform the node transition; and
- comparing, by a map merge unit, the semantic label information to the topology node to merge the topology node and the user's location information.

10. The atypical environment-based location recognition method of claim 9, further comprising performing, by a self-supervised learning unit, self-supervised learning for a series of metric map functions generated from a user's trajectory.

11. The atypical environment-based location recognition method of claim 9, further comprising performing, by a reinforcement learning unit, reinforcement learning when a metric map function sequence is generated in a path in which the topology node is generated.

12. The atypical environment-based location recognition method of claim 8, wherein the acquiring of user movement information comprises acquiring user movement information including the user's stride length, movement direction, and movement distance data and providing the user movement information to a topology map generation module.

13. The atypical environment-based location recognition method of claim 9, wherein the determining of whether there is a need for node transition further comprises:
- adding, by a link processing unit, a link between the node of the topology map and a subsequent node when the semantic label information corresponds to the node of the topology map in the determining;
- computing, by a link distance computation unit, a distance of the added link through the user movement information; and
- correcting, by a node transition unit, a location of the node of the topology map and the added link to correspond to the computed link distance.

14. The atypical environment-based location recognition method of claim 8, wherein the generating of a topology node comprises using uncorrected topology map information generated using actual map information.

* * * * *